United States Patent [19]

Watanabe et al.

[11] Patent Number: 4,905,097
[45] Date of Patent: Feb. 27, 1990

[54] IMAGE PROCESSING SYSTEM CAPABLE OF PROCESSING BOTH BINARY AND MULTIVALUE IMAGE DATA AND HAVING CONVERTERS FOR CONVERTING EACH TYPE OF IMAGE DATA INTO THE OTHER TYPE OF IMAGE DATA

[75] Inventors: Yasuhiro Watanabe, Yokohama; Yukari Shibuya, Kawasaki, both of Japan

[73] Assignee: Canon Kabushiki Kaisha, Tokyo, Japan

[21] Appl. No.: 97,491

[22] Filed: Sep. 14, 1987

[30] Foreign Application Priority Data

Sep. 20, 1986 [JP] Japan .................................. 61-222713
Sep. 26, 1986 [JP] Japan .................................. 61-229088
Sep. 26, 1986 [JP] Japan .................................. 61-229089
Oct. 6, 1986 [JP] Japan .................................. 61-237440

[51] Int. Cl.$^4$ ............................................. H04N 1/40
[52] U.S. Cl. .................................... 358/456; 358/448; 358/455
[58] Field of Search ............ 358/280, 284, 408, , 358/443, 445, 448, 455, 456 (U.S. only), 457 (U.S. only), 460 (U.S. only)

[56] References Cited

U.S. PATENT DOCUMENTS

4,698,688 10/1987 Ochi et al. ........................ 358/280

FOREIGN PATENT DOCUMENTS

60-1967 1/1985 Japan .................................. 358/280
60-246153 12/1985 Japan .................................. 358/280
62-117469 5/1987 Japan .
62-163468 7/1987 Japan .
62-188552 8/1987 Japan .

Primary Examiner—James J. Groody
Assistant Examiner—Randall S. Svihla
Attorney, Agent, or Firm—Fitzpatrick, Cella, Harper & Scinto

[57] ABSTRACT

An image processing system receives image data on a pixel unit basis and converts it into a digital signal and processing it. This system includes: a binary image processor to image process one pixel of image data as a binary digital signal (binary image data); a multivalue image processor to image process one pixel of the image data as a multivalue digital signal (multivalue image data); a binary/multivalue converter to convert the binary image data into the multivalue image data; and a multivalue/binary converter to convert the multivalue image data into the binary image data. The binary image processor and multivalue image processor can transmit and receive data therebetween and can image process any of the binary image data and multivalue image data. The binary digital data is directly transferred to the multivalue image processor. The multivalue digital data is converted into the binary data by the multivalue/binary converter and thereafter, this binary data is transferred to the binary image processor. With this system, the binary and multivalue image data can be integratedly image processed.

49 Claims, 17 Drawing Sheets

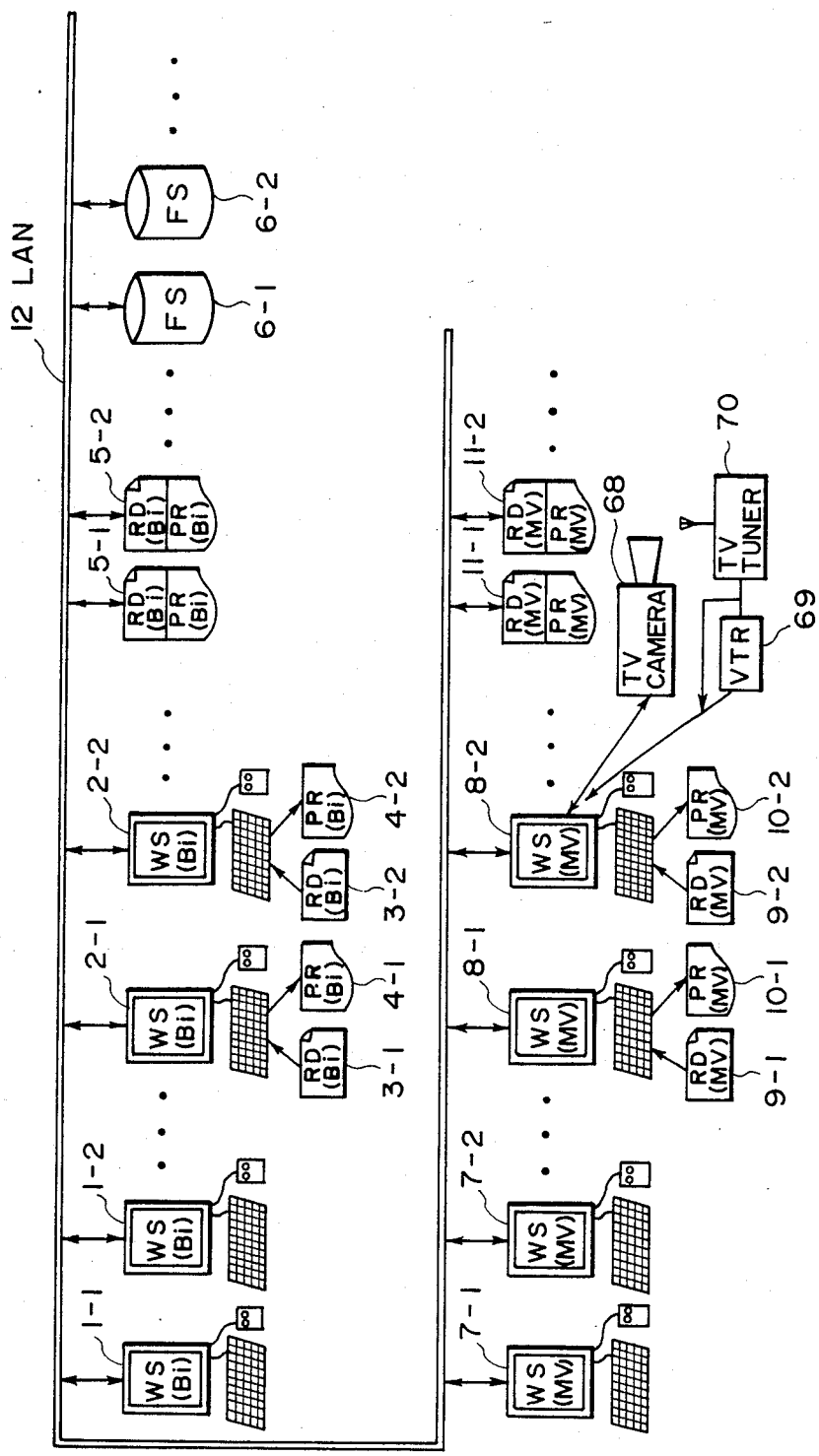
F I G. 1

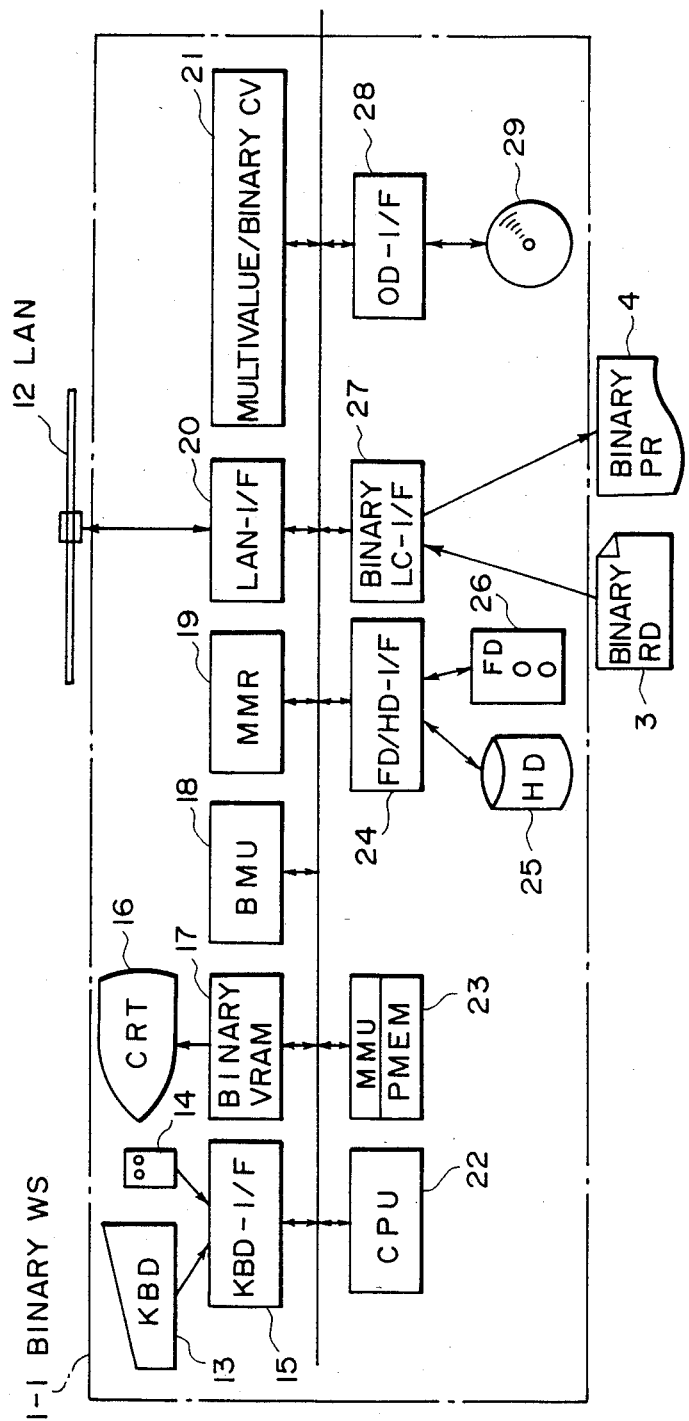
F I G. 2

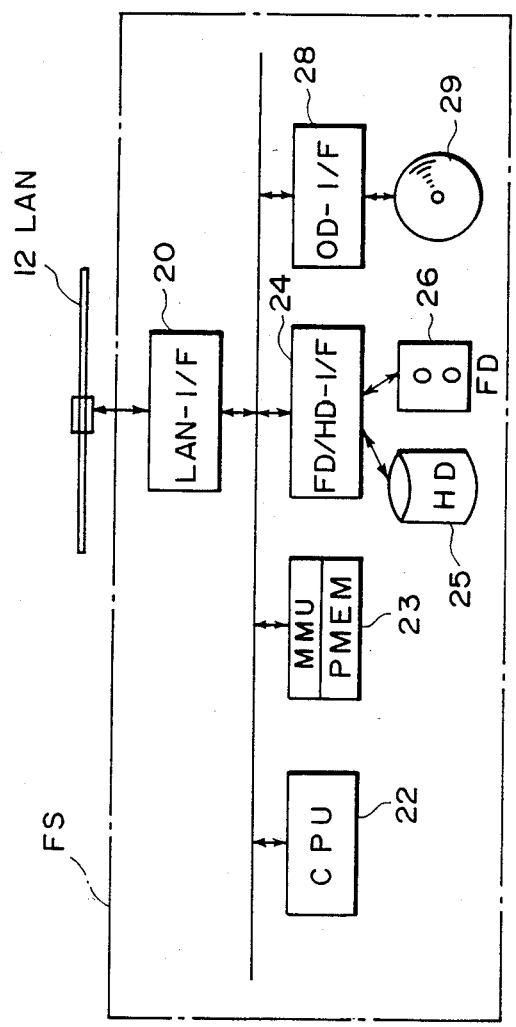
F I G. 4

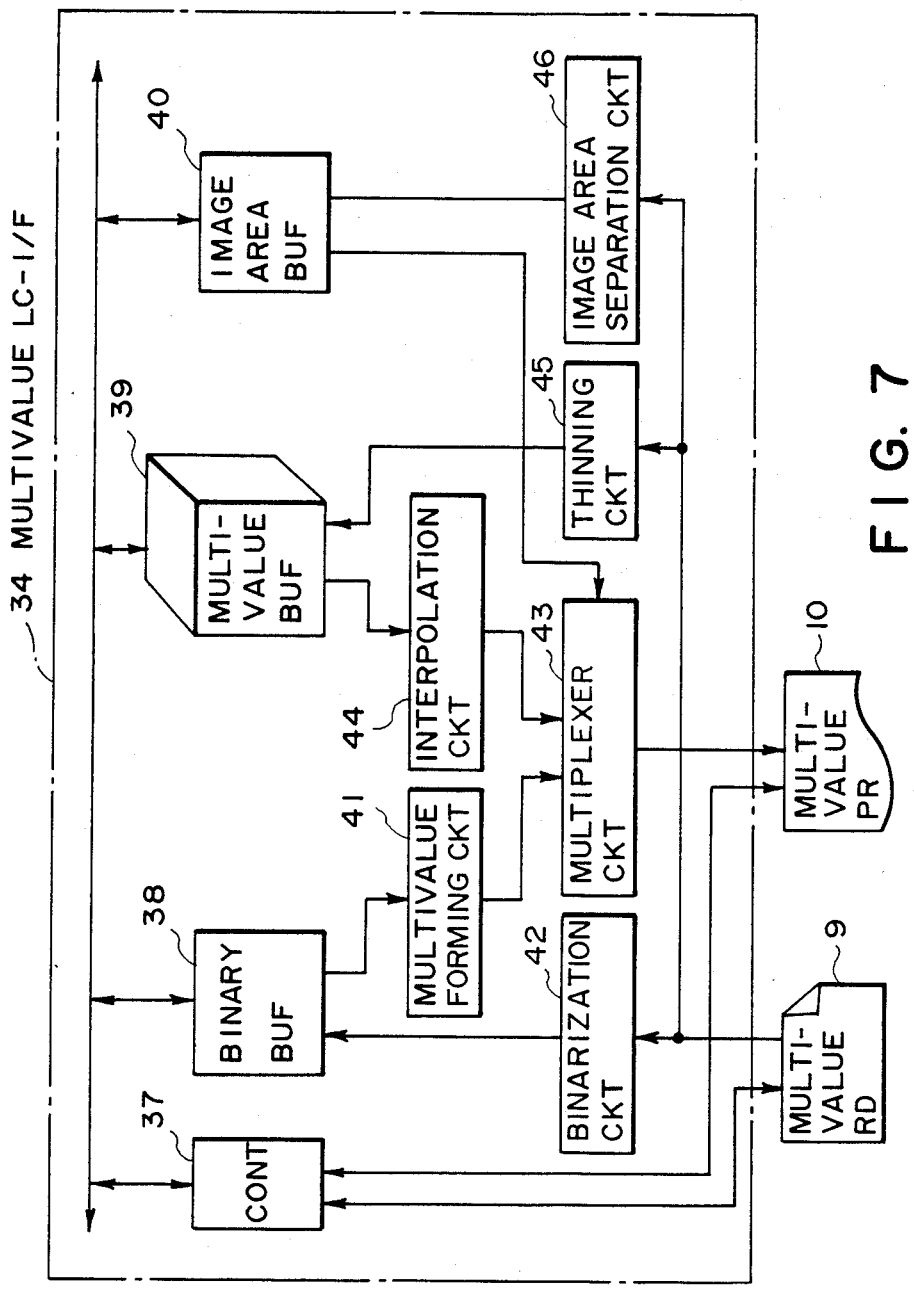
F I G. 7

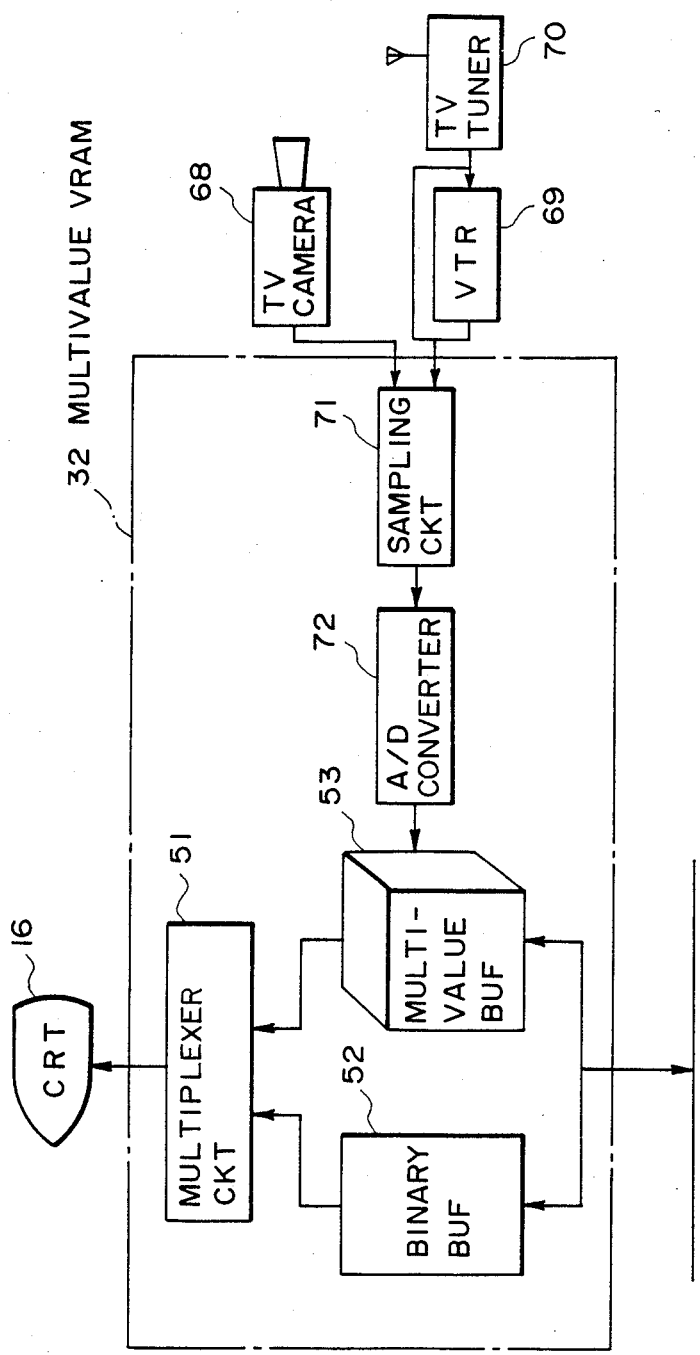
F I G. 8

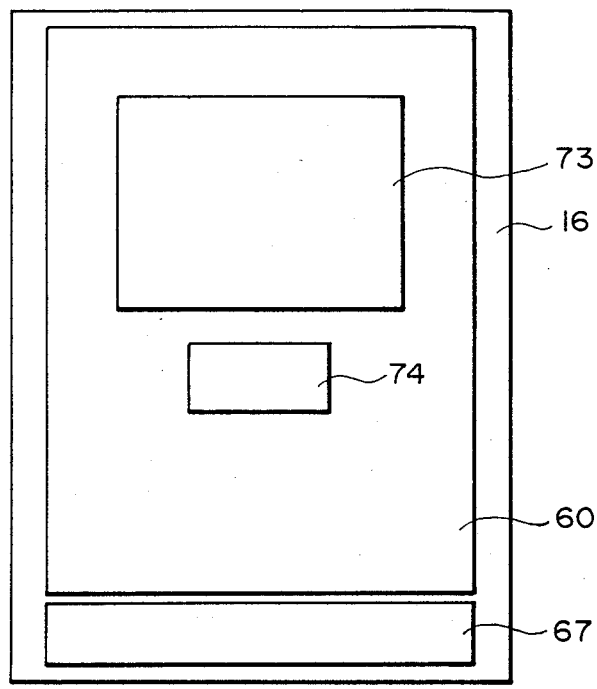
F I G. 14
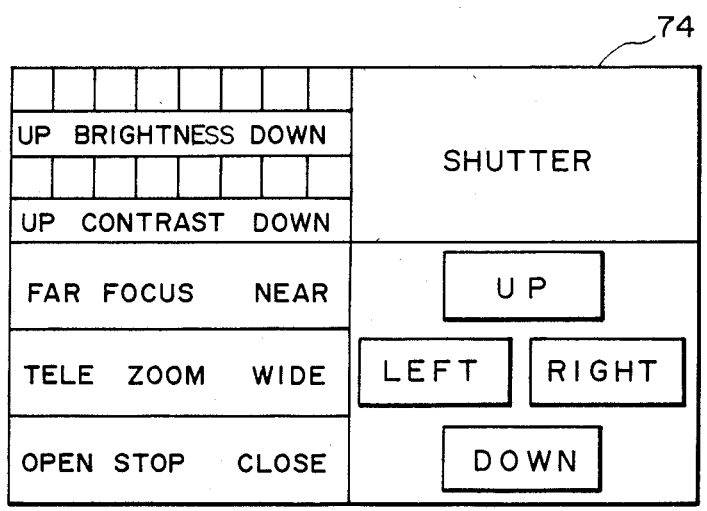
F I G. 15

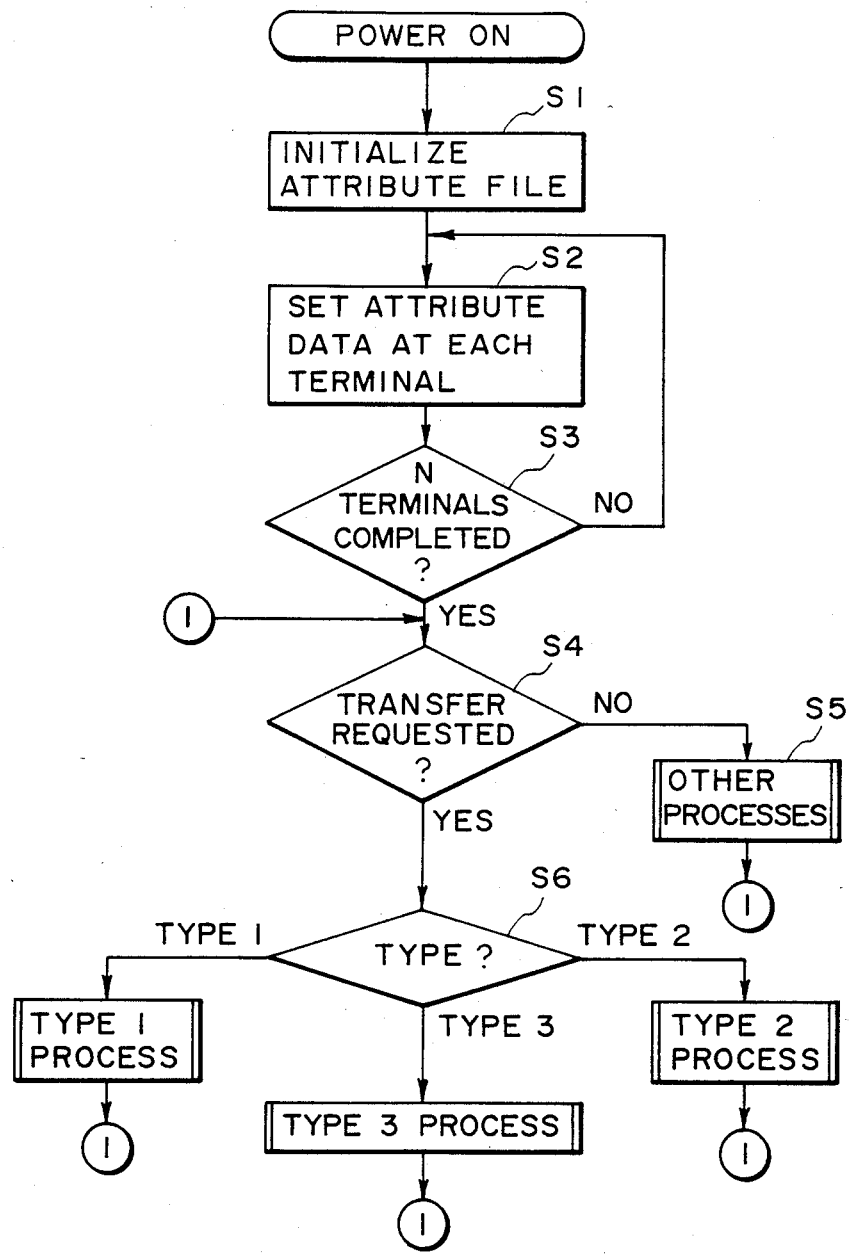
F I G. 16

IMAGE PROCESSING SYSTEM CAPABLE OF PROCESSING BOTH BINARY AND MULTIVALUE IMAGE DATA AND HAVING CONVERTERS FOR CONVERTING EACH TYPE OF IMAGE DATA INTO THE OTHER TYPE OF IMAGE DATA

BACKGROUND OF THE INVENTION

1. Field of the Invention

The present invention relates to an image processing system for receiving image data of a document, original, or the like on a pixel unit basis, for converting it into a digital signal, and for processing this digital signal and, more particularly, the present invention relates to an image processing system capable of processing one pixel of image data by both of the binary digital signal and the multivalue digital signal.

2. Related Background Art

Hitherto, there has been generally known an image processing system in which image data such as diagram, document, or the like is read on a pixel unit basis by a photoelectric converting device or the like and converted into a binary digital signal and subjected to processes such as editing, display, storage, and the like. On the other hand, in recent years, there has been developed an image processing system in which image data is converted into a multivalue digital signal and processed in order to process image data having a half tone expression such as a photograph or the like and further to perform image processes such as gradation conversion, edge emphasis, cut-out of a target image data, etc.

However, in the image processing system for performing image processes on the signal (hereinafter, referred to as the binary image data) derived by converting image data into a binary digital signal, the image processes cannot be performed on the signal (hereinafter, referred to as the multivalue image data) derived by converting image data into a multivalue digital signal. In addition, even in the image processing system for performing image processes on multivalue image data, the image processes cannot be performed on the binary image data. In other words these image processing systems lack flexibility.

Hitherto, there has been known a method whereby multivalue image data is expressed as a pseudo half tone by binary image data on the basis of a dither method, a density pattern method, or the like. However, there is a drawback such that the picture quality deteriorates because of the deterioration of the gradation and resolution, the occurrence of the moire, and the like.

SUMMARY OF THE INVENTION

In consideration of the foregoing points, it is an object of the present invention to eliminate the above-mentioned drawbacks.

Another object of the invention is to provide an image processing system having a high degree of generality in which binary image data and multivalue image data are integrated and image processes such as document editing, print-out, and the like can be performed.

Still another object of the invention is to provide an image processing system having binary image processing means and multivalue image processing means capable of performing the transmission and reception of data therebetween.

Still another object of the invention is to provide an image processing system having binary image processing means, multivalue image processing means, and A/D converting means for converting a video signal into multivalue image data.

BRIEF DESCRIPTION OF THE DRAWINGS

FIG. 1 is a constitutional diagram of an image processing system to which the present invention is applied;

FIG. 2 is a block diagram showing an internal constitution of a binary WS;

FIG. 4 is a block diagram showing an internal constitution of an FS;

FIG. 7 is a block diagram showing an internal constitution of a multivalue LC - I/F;

FIG. 8 is a block diagram showing an internal constitution of a multivalue VRAM;

FIGS. 12-1, 12-1A, 12-1B, 12-2, 12-2A, and 12-2B show a schematic flowchart for the integration document editing;

FIG. 14 is a diagram showing an example of a display screen in the monitoring of a TV camera;

FIG. 15 is a diagram showing an example of a display of commands for the TV camera monitor; and FIG. 16 is an explanatory diagram of another embodiment.

DETAILED DESCRIPTION OF THE PREFERRED EMBODIMENTS

An embodiment of the present invention will be described in detail hereinbelow with reference to the drawings.

Figures 1, 12:
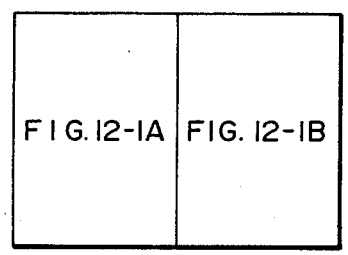
Figures 1B, 12:
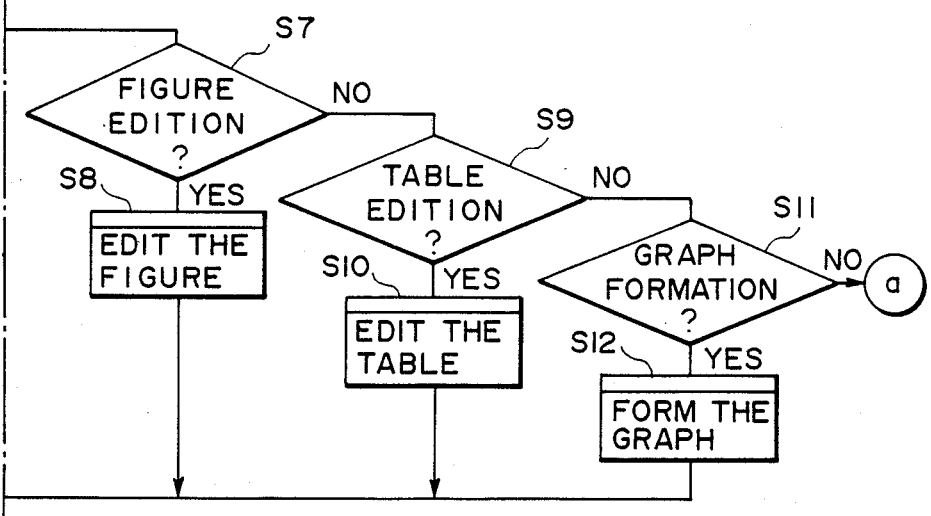
Figures 1A, 12:
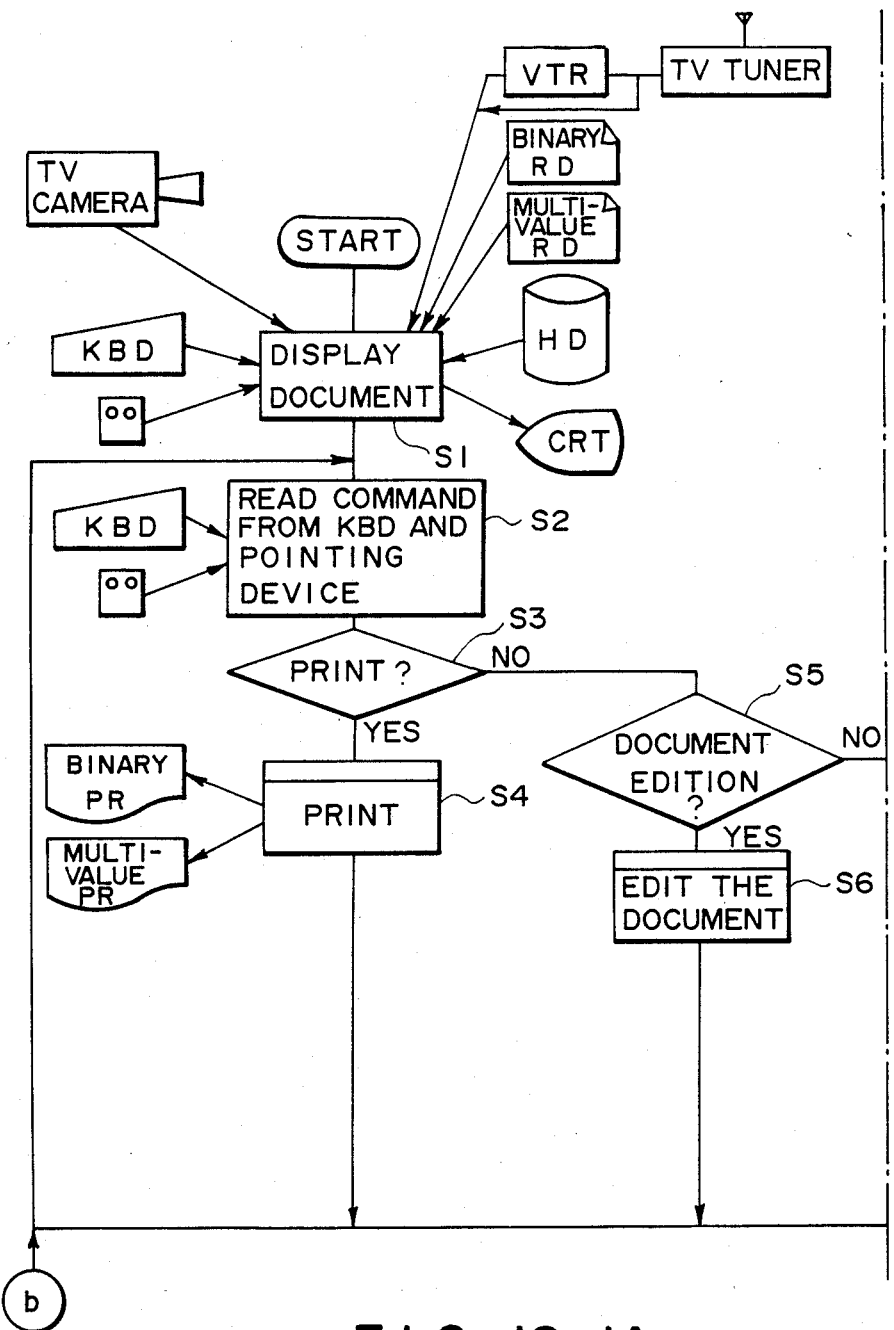
Figures 2B, 12:
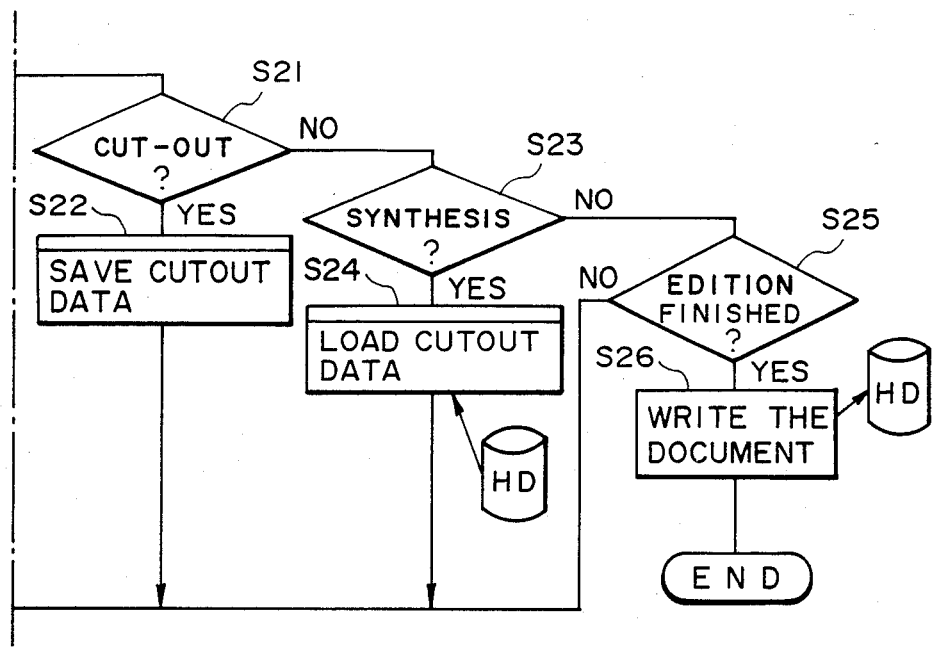

FIG. 1 is a constitutional diagram of an image processing system to which the invention is applied.

In FIG. 1, reference numerals 1-1, 1-2, ..., 2-1, and 2-2 denote binary image processing work stations (hereinafter, referred to as binary WS) which can edit and display binary image data; 3-1, 3-2, ... indicate image readers (hereinafter, referred to as binary RD) to binarize and read image data; and 4-1, 4-2, ... represent image printers (hereinafter, referred to as binary PR) to print the binarized image data. The binary RD 3-1, 3-2, ... and binary PR 4-1 and 4-2 are connected to the binary WS 2-1, 2-2, ..., respectively. The binary WS 2-1, 2-2, ... can transmit and receive binary image data to and from reader/printer systems (hereinafter, referred to as binary RD/binary PR systems) 5-1, 5-2, ... each consisting of the binary image reader and binary image printer through a network (hereinafter, abbreviated to LAN) 12, respectively.

With the foregoing constitution, the binary WS 1-1, 1-2, ... can receive the binary image data from either one of the binary RD/binary PR systems 5-1, 5-2, ... through the LAN 12 and perform the editing such as cut-out, of the binary image data, and enlargement, reduction, rotation, movement, synthesis, etc. of the cut-out binary image data while displaying the editing content on a display device. These binary WS can transfer the binary image data obtained finally to either one of the binary RD/binary PR systems 5-1, 5-2, . . . through the LAN 12 and can print this data. In addition, the binary WS can also store the binary image data in an external memory device of the binary WS or into either one of memory device file servers (hereinafter, referred to as FS) 6-1 and 6-2 connected via the LAN 12. The binary WS 2-1, 2-2, . . . can also transmit and receive binary image data to and from the binary RD/binary PR systems on the network, can directly read the binary image data from the binary RD 3-1, 3-2, . . . connected, and can also print the binary image data using the binary PR 4-1, 4-2, . . . .

Further, numerals 7-1, 7-2, . . . , 8-1, 8-2, . . . denote multivalue image processing work stations (hereinafter, abbreviated to multivalue WS) capable of editing and displaying multivalue image data; 9-1, 9-2, . . . indicate image readers (hereinafter, referred to as multivalue RD) to convert image data into multivalues and read; and 10-1, 10-2, . . . represent image printers (hereinafter, referred to as multivalue PR) capable of printing the image data converted into the multivalue data by reproducing half tones.

The multivalue WS 7-1, 7-2, . . . , 8-1, 8-2, . . . can receive the multivalue image data from either one of the multivalue RD, can edit and display it, can transfer the multivalue image data to either one of the multivalue PR, can print, and can also store in either the FS 6-1 or the FS 6-2 in a manner similar to the case of the binary WS. The multivalue image data can be also subjected to editing such as cutout, enlargement, reduction, rotation, movement, synthesis, etc. of the cut-out portions, gradation conversion, edge emphasis, etc.

Either one of a television (TV) camera input device 68, a VTR (video tape recorder) 69, and a television (TV) tuner 70 is connected to the multivalue WS 8-2.

Figures 2, 12:
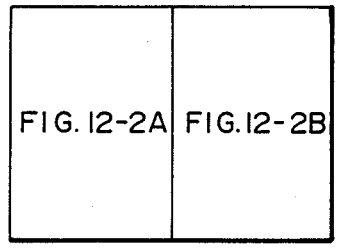
Figures 2A, 12:
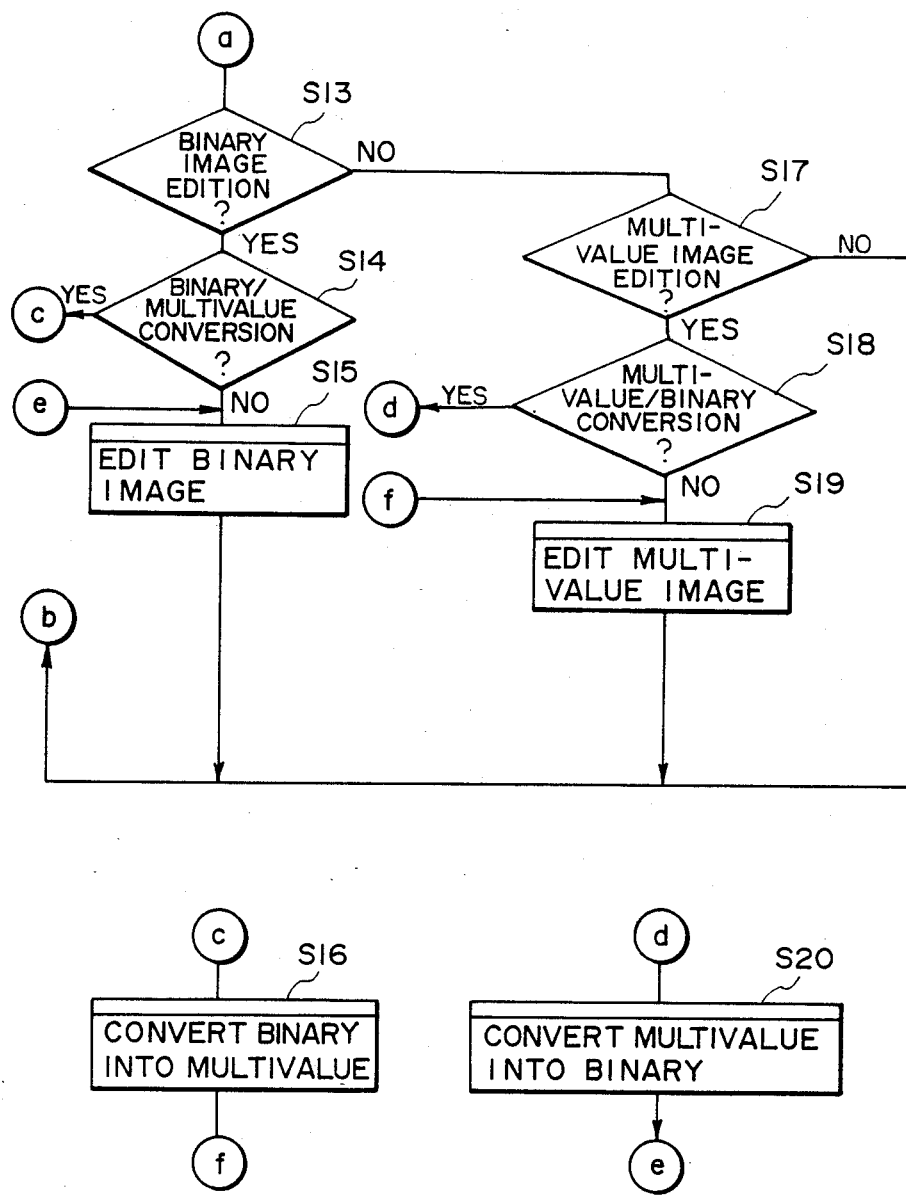

FIG. 2 is a block diagram showing an internal constitution of the binary WS 1-1, 1-2, . . . , 2-1, 2-2, . . . . As fundamental components, there are provided: an input keyboard 13; a pointing device 14; a keyboard interface KBD-I/F 15; a CPU 22; a program memory 23 including an MMU (memory management unit); an interface FD/HD-I/F 24 to drive a hard disk and to drive a floppy disk; a hard disk drive (hereinafter, referred to as an HD) 25; a floppy disk drive (hereinafter referred to as an FD) 26; a CRT display 16; and a video RAM 50 (hereinafter, referred to as a binary VRAM) 17 for display. A bit manipulation unit (hereinafter, referred to as a BMU) 18 can transfer a large amount of data at a high speed on a word unit basis and on a bit unit basis among the program memory PMEM 23, the binary VRAM 17, the input/output apparatuses, etc. without passing through the CPU 22. The BMU 18 further has the logic arithmetic operating function of transmission side data and reception side data, a rotating function, and a variable magnification function. For the variable magnification function, binary image data such as a diagram or the like and multivalue image data such as a photograph or the like can be individually variably magnified. Further, the binary WS has a compressing-/expanding circuit (or compandor) (hereinafter referred to as an MMR) 19 having the function to compress and expand data and an interface LAN-I/F 20 to connect the binary WS and the LAN. The binary WS may also have an optical disk (hereinafter, referred to as an OD) 29 if a file of a large memory capacity is necessary and an interface OD-I/F 28 for the OD 29.

The binary WS also has an interface binary LC-I/F 27 to directly connect either or both of the binary RD3 and the binary PR4. Since the internal structure of the LC-I/F 27 is well known, it is omitted. However, the LC-I/F 27 has therein a buffer to store binary image data and has a function to directly transfer the read data from the binary RD 3 to the binary PR 4 and to realize the local copy.

Figure 10:
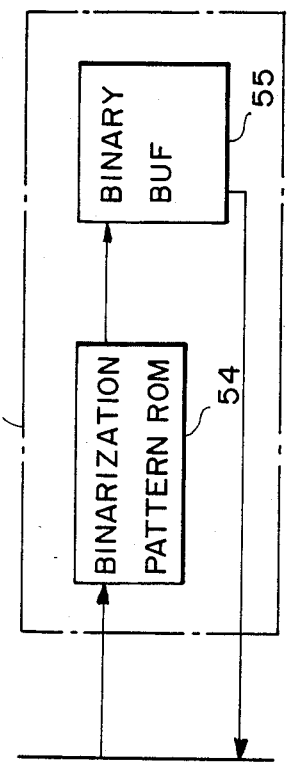
FIG. 10 is an internal constitutional diagram of a multivalue/binary converter.

The binary WS 1-1, 1-2, . . . receive the binary image data transmitted through the LAN 12 by the LAN-I/F 20 and expanded by the MMR 19 and transfer the image data to the PMEM 23 or binary buffer of the binary LC-I/F 27. This data is edited by use of the function of the BMU 18 and transferred to the binary VRAM 17, thereby enabling the edited image data to be displayed on the CRT display 16. The edited binary image data can be also stored into the HD 25, FD 26, and OD 29 and can be also transferred to the binary PR 5-1 and 5-2 or FS 6-1 and 6-2 shown in FIG. 1 via the LAN 12. A multivalue/binary CV 21 has a function to convert multivalue image data into binary image data and converts the multivalue image data transferred through the LAN 12 into the binary image data and stores in a binary buffer (BUF). Its internal constitution is as shown in FIG. 10. The corresponding density pattern is transferred from a binarization pattern ROM 54 to a binary BUF 55 in correspondence to one pixel of the multivalue image data. Thus, the binary WS 1-1, 1-2, . . . , 2-1, . . . can synthesize and edit the binary image data and multivalue image data as the same binary image data and can transfer the resultant data to the binary PR 4.

Figure 3:
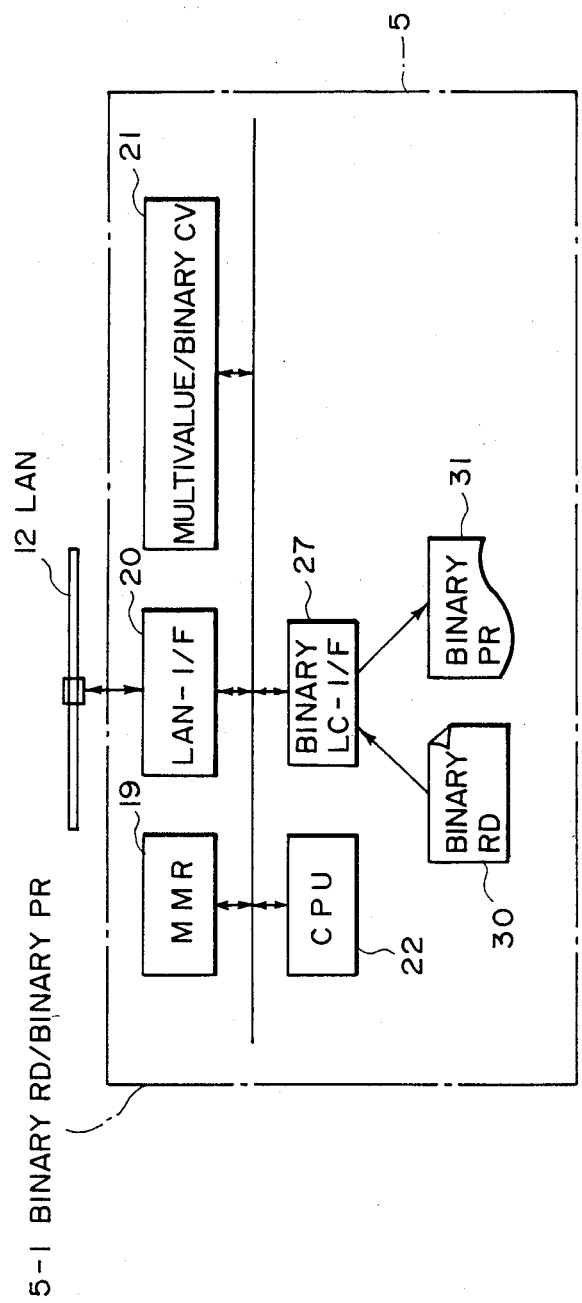
FIG. 3 is a block diagram showing an internal constitution of a binary RD/binary PR system.

FIGS. 3 and 4 are block diagrams (the same components as those shown in FIG. 2 are designated by the same reference numerals) showing internal constitutions of the binary RD/binary PR systems 5-1, 5-2, . . . , FS 6-1, 6-2, . . . . In this constitution, the binary RD/binary PR systems 5-1, 5-2, . . . read image data and send as the binary image data to the LAN 12. Or, the systems 5-1, 5-2, . . . receive the binary image data from the LAN 12 and print or can locally copy. On the other hand, the FS 6-1, 6-2, . . . have functions to perform the ordinary file management and to store binary and multivalue image data in the HD 25, FD 26, and OD 29.

Figure 5:
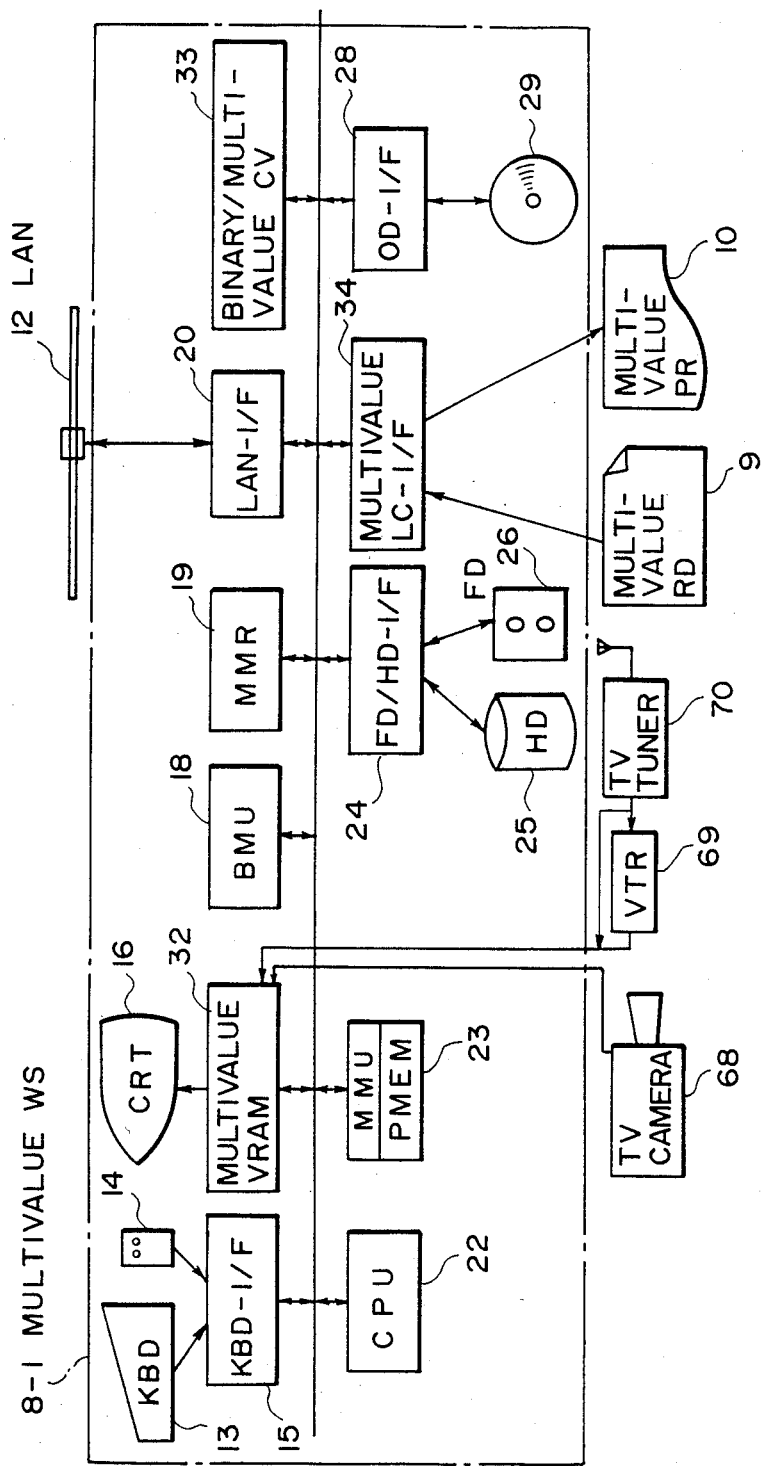
FIG. 5 is a block diagram showing an internal constitution of a multivalue WS.
Figure 6:
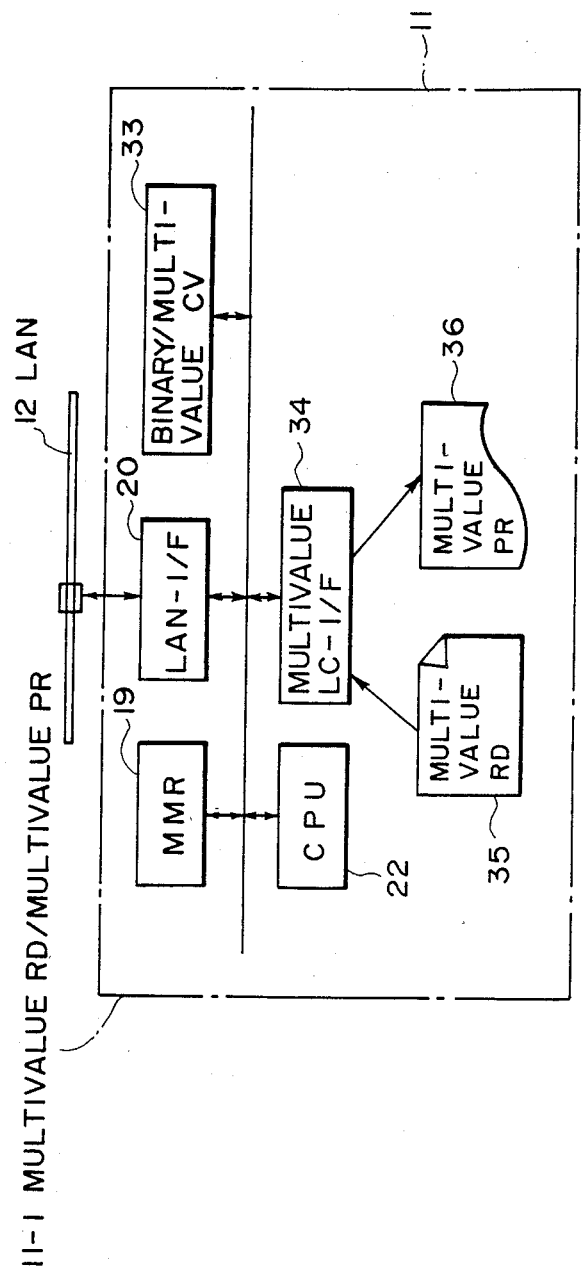
FIG. 6 is a block diagram showing an internal constitution of a multivalue RD/multivalue PR system.

FIGS. 5 and 6 (the same components as those shown in FIG. 2 are designated by the same reference numerals) are block diagrams showing internal constitutions of the multivalue WS 7-1, 7-2, . . . , 8-1, 8-2, . . . and of the multivalue RD/multivalue PR systems 11-1, 11-2, . . . , respectively. The difference between these multivalue systems and the binary RD/binary PR systems is the presence of a video RAM 32 and a multivalue LC-I/F 34. The multivalue LC-I/F 34 is needed to connect the multivalue RD 9 with the multivalue PR 10. To display multivalue image data as an image, the multivalue VRAM 32 is necessary.

The multivalue LC-I/F 34 is constituted as shown in FIG. 7. The multivalue RD 9 controlled by a controller 37 has functions to read out image data through a thinning circuit 45 and write in a multivalue BUF 39 and to separate the image data into an image area for the binary image data such as diagrams, characters, etc. and an image area for the multivalue image data having half tones such as a photograph or the like as necessary. The image area separation data is stored in an image area BUF 40 through an image area separation circuit 46.

The data such as diagrams, characters, etc. is binarized by a binarization circuit 42 and stored in a binary BUF 38. The multivalue image data in the multivalue BUF 39 can be also transferred to the multivalue PR 10 and printed.

The binary image data in the binary BUF 38 is converted into the multivalue data by a multivalue forming circuit 41 and is multiplexed with the multivalue image data from the multivalue BUF 39 through a multiplexer circuit 43 and can be transferred to the multivalue PR10. The multivalue VRAM 32 is constituted as shown in FIG. 8. The VRAM 32 can store multivalue image data in a multivalue BUF 53 and can display on the CRT display 16. In addition, the binary image data can be stored in a binary BUF 52 and can be multiplexed with the multivalue image data by the multiplexer circuit 51 and can be displayed.

Figure 11:
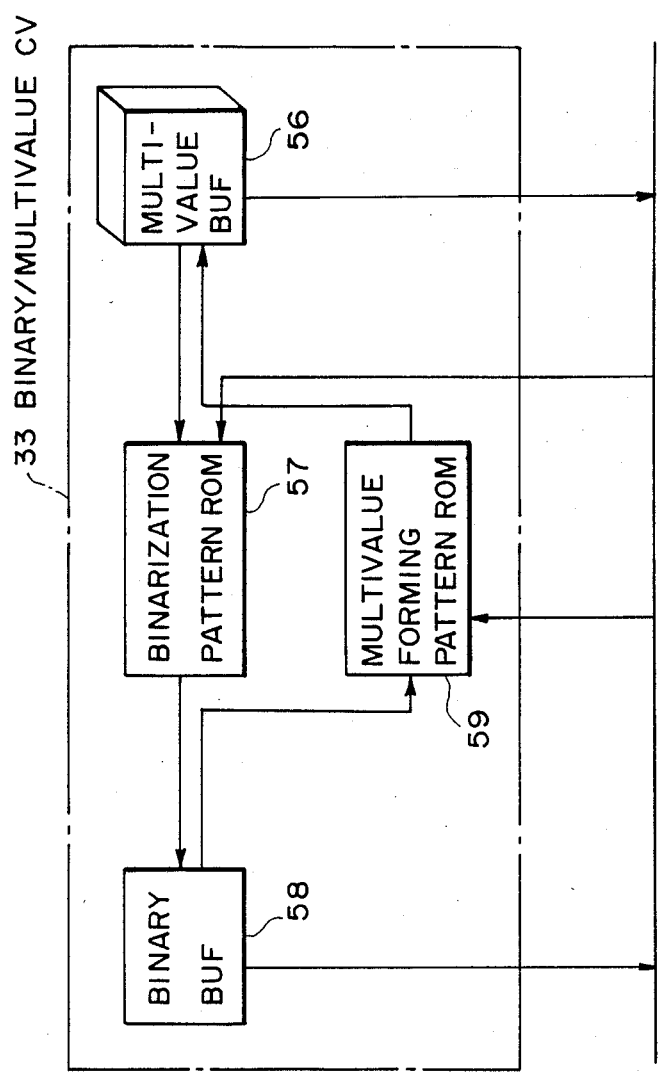
FIG. 11 is an internal constitutional diagram of a binary/multivalue converter.

A binary/multivalue CV 33 has a function to convert binary image data into multivalue image data or from multivalue image data into binary image data. The internal constitution of the CV 33 is as shown in FIG. 11. The CV 33 reads out the data from a multivalue BUF 56 and transfers the corresponding density pattern from a binarization pattern ROM 57 to a binary BUF 58 in correspondence to one pixel. If the binary image data is the data such that the half tone expression is expressed by a density pattern, the data is read out of the binary BUF 58 and the multivalue data to express the gradation of corresponding one pixel is read out of a multivalue forming pattern ROM 59 and transferred to the multivalue BUF 56.

Due to this, the multivalue WS 8-1, 8-2, . . . can synthesize and edit the binary image data and multivalue image data as the same image data and can also transfer the resultant data to the multivalue PR 10 and to the binary PR 4.

On the other hand, when the TV camera input device 68 or VTR 69 is connected to the multivalue WS or when the TV tuner 70 is connected thereto through the VTR 69, in order to monitor these input data, the multivalue VRAM 32 has functions to repeatedly write the multivalue image data through a video signal sampling circuit 71 and an A/D converter 72 and to hold the data at that time by the operation to make a shutter of the TV camera input device 68 operative. Further, the multivalue VRAM 32 has a function to transmit various kinds of monitoring commands of the TV camera input device 68.

In the foregoing constitution, the multivalue WS can realize the functions similar to those of the binary WS with respect to the multivalue image and can process a multivalue image together with a binary image as necessary.

Figure 9:
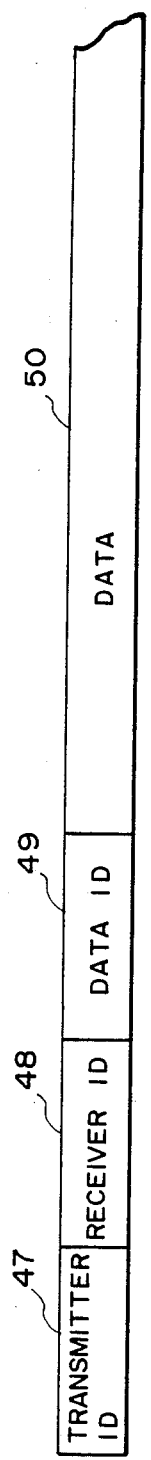
FIG. 9 is a diagram showing a data format including binary image data and multivalue image data on a network.

In order to discriminate the binary image data and multivalue image data as mentioned above and to discriminate the data transfer among various kinds of apparatuses, a data format on the LAN 12 can be realized as shown in FIG. 9. In the diagram, reference numerals 47 and 48 denote ID (identification) numbers indicative of the transmission side (i.e., transmitter) and the reception side (i.e., receiver). These ID numbers are added from the transmission side. Numeral 49 denotes an ID number indicative of the content of data. The number indicative of a binary image is added in the binary RD/binary PR system or binary WS connected with the binary RD. The number indicative of a multivalue image is added in the case of the multivalue RD/multivalue PR system or multivalue WS connected with the multivalue RD. The binary image or multivalue image is stored into a data area 50 in accordance with the data ID 49. Binary image or multivalue image is stored into the data area 50.

The operation of the foregoing embodiment will now be described in accordance with document edition flowcharts shown in FIGS. 12(1) and 12(2).

First, in step S1, the binary image from the binary RD, the multivalue image from the multivalue RD, document, figure, table, graph, binary image, or the multivalue image stored in the HD, multivalue image from the camera input device or VTR, integrated document of them, or white paper is selected and displayed. In the next step S2, the processing routine is branched to the following processes on the basis of the kinds of documents displayed and the designated command. The processes include: a printing process S4; a document input editing S6; a figure edition S8; a table editing S10; a formation of a graph S12; binary image editing S15; a multivalue image editing S19; a cut-out of data S22; and a synthesis of data S24.

When the binary/multivalue conversion is designated for the binary image, the binary image is converted into the multivalue image in step S16 and the multivalue image editing in step S19 is executed.

On the other hand, when the multivalue/binary conversion is designated for the multivalue image, the multivalue image is converted into the binary image in step S20. The binary image editing in step S15 is executed.

In the binary image edition, figures, characters, etc. are cut-out and the cut-out portions can be enlarged, reduced, rotated, moved, and synthesized. In the multivalue image editing, the gradation conversion, edge emphasis, cut-out of a target image data, and the like can be performed in addition to those image processes.

When the document editing has been completed in step S25, the document is written in step S26 and printed out, displayed, and stored in a hard disk or the like. Then, this flow is finished.

Figure 13:
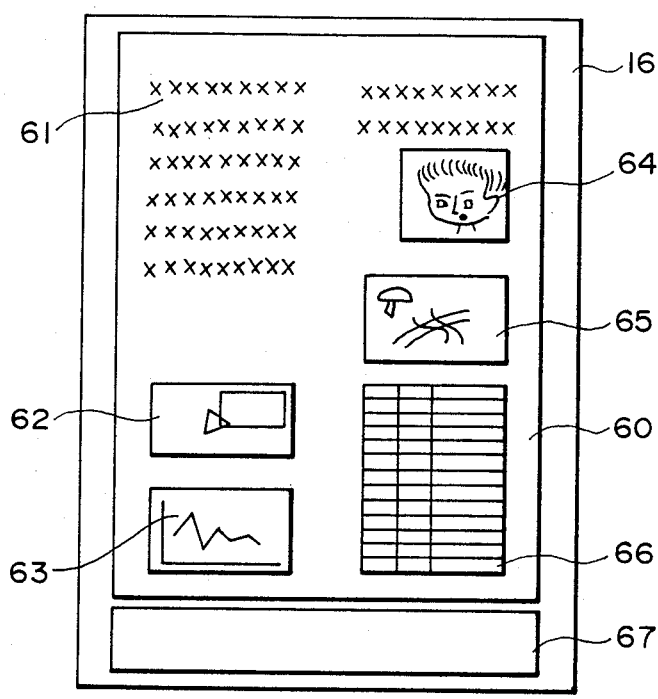
FIG. 13 is a diagram showing an example of a display of an integrated document.

In the image processing system having the foregoing constitution, a document as shown in FIG. 13 can be displayed and edited in the multivalue WS 7-1, 7-2, . . . , 8-1, 8-2, . . . in FIG. 1. In FIG. 13, reference numeral 60 denotes an integrated document including a document 61, a FIG. 62, a graph 63, a table 66, a multivalue image 64 such as a photograph or the like, and a binary image 65 such as a figure or the like. Numeral 67 denotes a display area to instruct editing commands which differ in dependence on the editing state.

The document 61, FIG. 62, graph 63, and table 66 are developed as bits in the binary BUF 52 in FIG. 8 from the code data, respectively. The binary image 65 is thinned out by the variable magnification function of the BMU 18 in FIG. 5 and transferred to the same binary BUF 52. On the other hand, the multivalue image 64 is transferred to the multivalue BUF 53 in FIG. 8 by the function of the BMU 18. Desired image data is read out of the multivalue BUF 53 and multiplexed and displayed on the CRT display 16 in FIG. 5.

Further, a video signal from the TV camera is input by use of a display pattern as shown in FIG. 14 in step S1. Namely, for example, when the integrated document 60 is displayed, a monitor screen 73 is displayed over it.

This function can be realized by repeatedly writing input video signals from the TV camera input device 68 into the portion corresponding to the monitor screen of the multivalue BUF 53. Commands 74 are displayed to remote control the TV camera input device 68 in the multivalue WS 8-2. The display content is as shown in, e.g., FIG. 15. Commands of brightness, contrast, focus, zoom, stop, shutter, and UP, DOWN, LEFT, and RIGHT of the tilting base of the TV camera are displayed. When the brightness or contrast is designated in this case, its value is sent to the TV camera input device 68.

On the other hand, with respect to the focus, zoom, and stop, while the corresponding portions of FAR, NEAR, TELE, WIDE, OPEN, and CLOSE are respectively continuously designated, these commands are continuously sent to perform the designated adjustments.

The adjustments are also similarly performed with regard to UP, DOWN, LEFT, and RIGHT.

When the shutter is designated, the monitor is stopped and the data in the multivalue BUF 53 at that time is specified as input data.

A multivalue image is edited hereinbelow in a manner similar to the above.

Although the image processing system coupled by a network has been described in the above embodiment, the invention is not limited to this constitution. A part of the system may be omitted or modified. The invention can be also realized in a single apparatus.

Since the image processing system of the invention has been constituted as described above, it is possible to provide an image processing system having a high generality in which even a stereoscopic object photographed by a video camera or the like can be also soon interposed and edited as a photograph into a document.

As described in detail above, since the image processing system of the invention has been constituted, even in an image processing system for processing an image by multivalue image data, binary image data can be image processed and an image processing system having a high generality can be provided.

As described in detail above, since the image processing system of the invention has been constituted, it is possible to provide an image processing system having a high generality in which image processes can be performed even by binary image data, multivalue image data, and their multiplexed image data.

The invention can be also applied to another embodiment which is constituted in a manner such that data indicative of the attribute of a terminal connected to the system, for example, with respect to whether the terminal is the WS for processing binary data, WS for processing multivalue data, binary RD/PR system, multivalue RD/PR system, or the like is properly constructed as an attribute file into the FS or memory of each WS, and the attribute on the transmission side and the attribute on the reception side are compared and the data is converted so as to always reduce the time which is occupied by the data on the LAN 12 or data bus.

FIG. 16 shows a flowchart for explaining the foregoing processes. An explanation will now be described on the basis of a constitution such that the FS for management controls the whole system. However, the invention is not limited to this constitution. First, when the power supply is turned on, the attribute file is initialized (step S1). The attribute data of all of the (n) terminals is set into the attribute file (steps S2 and S3). In the next step S4, a check is made to see if a data transfer has been requested or not. If NO, for example, the image editing or the like is performed in each terminal and the attribute file is updated in accordance with this process (step S5).

If the data transfer has been requested in step S4, the attributes on the transmission and reception sides are compared. Only the case of multivalue/binary will be explained here. A check is made to see if the transmission side is the terminal to process binary data and the reception side is also the same terminal, or the transmission side is the terminal to process multivalue data and the reception side is also the same terminal (type 1), or the transmission side is the terminal to process binary data and the reception side is the terminal to process multivalue data (type 2), or the transmission side is the terminal to process multivalue data and the reception side is the terminal to process binary data (type 3) (step S6). If the type 2 has been determined in step S6, the binary data is directly transferred and at the terminal for processing the multivalue data on the reception side, the binary data is converted into the multivalue data by the binary/multivalue CV 33 in FIGS. 5 and 6 which have already been described. In the case of the type 3, the multivalue data is converted into the binary data on the transmission side in order to reduce the transfer load on the LAN and data bus and transferred to the terminal for processing the binary data on the reception side. In the case of this embodiment, the multivalue/binary CV 21 which has been described in FIGS. 2 and 3 is provided in FIG. 5 or 6.

What is claimed is:

1. An image processing system comprising:
    binary image processing means for image processing one pixel of image data as a binary digital signal (referred to as binary image data);
    multivalue image processing means for image processing one pixel of image data as a multivalue digital signal (referred to as multivalue image data);
    binary/multivalue converting means for converting the binary image data into multivalue image data; and
    multivalue/binary converting means for converting the multivalue image data into binary image data,
    wherein said binary image processing means processes binary image data converted by said multivalue/binary converting means and said multivalue image processing means processes multivalue data converted by said binary/multivalue converting means and wherein said binary image processing means and said multivalue image processing means can transmit and receive image data to and from each other and can image process either binary image data or multivalue image data.

2. An image processing system according to claim 1, wherein when the binary image data is transmitted from said binary image processing means to said multivalue image processing means, it is directly transmitted as binary image data, and when the multivalue image data is transmitted from said multivalue image processing means to said binary image processing means, it is first converted into binary image data by said multivalue/binary converting means and is then transmitted as binary data.

3. A system according to claim 1, wherein said binary image processing means edits the binary image data via cutting part of it out.

4. A system according to claim 1, wherein said binary image processing means edits the binary image data via rotation thereof.

5. A system according to claim 1, wherein said binary image processing means edits the binary image data via movement thereof.

6. A system according to claim 1, wherein said binary image processing means edits the binary image data via synthesis thereof.

7. A system according to claim 1, wherein said binary image processing means edits the binary image data via enlargement or reduction thereof.

8. A system according to claim 1, wherein said binary image processing means executes a variety of editing processes for a cut-out portion of an image represented by the binary image data.

9. A system according to claim 1, wherein said binary image processing means includes display means for displaying a binary image represented by the binary image data.

10. A system according to claim 1, wherein said multivalue image processing means edits the multivalue image data via cutting part of it out.

11. A system according to claim 1, wherein said multivalue image processing means edits the multivalue image data via rotation thereof.

12. A system according to claim 1, wherein said multivalue image processing means edits the multivalue image data via movement thereof.

13. A system according to claim 1, wherein said multivalue image processing means edits the multivalue image data via synthesis thereof.

14. A system according to claim 1, wherein said multivalue image processing means edits the multivalue image data via enlargement of reduction thereof.

15. A system according to claim 1, wherein said multivalue image processing means executes gradation conversion of the multivalue image data.

16. A system according to claim 1, wherein said multivalue image processing means executes edge emphasis of the multivalue image data.

17. A system according to claim 1, wherein said multivalue image processing means executes a variety of editing processes for a cutout portion of an image represented by the multivalue image data.

18. A system according to claim 1, wherein said multivalue image processing means includes display means for displaying the multivalue image data.

19. A system according to claim 1, further comprising a local area network, wherein said multivalue image processing means and said binary image processing means are connected to each other via said local area network.

20. A system according to claim 1, further comprising reading means for inputting the binary image data and printing means for outputting the binary image data.

21. A system according to claim 1, further comprising reading means for inputting the multivalue image data and printing means for outputting the multivalue image data.

22. A system according to claim 21, further comprising a local area network, wherein said reading means and said printing means are connected to said binary image processing means via said local area network.

23. A system according to claim 1, further comprising a TV camera connected to said multivalue image processing means for inputting the multivalue image data.

24. An image processing system comprising:
multivalue image processing means for image processing one pixel of image data as a multivalue digital signal (referred to as multivalue image data);
binary/multivalue converting means which, when binary image data representing one pixel of image data is input to said multivalue image processing means to be processed, converts the binary image data into multivalue image data; and
editing means for editing, together with other multivalue image data processed by said multivalue image processing means, the multivalue image data which was converted from the binary image data by said binary/multivalue converting means.

25. A system according to claim 24, wherein said editing means causes said multivalue image processing means to edit the multivalue image data via cutting part of it out.

26. A system according to claim 24, wherein said editing means causes said multivalue image processing means to edit the multivalue image data via rotation thereof.

27. A system according to claim 24, wherein said editing means causes said multivalue image processing means to edit the multivalue image data via movement thereof.

28. A system according to claim 24, wherein said editing means causes said multivalue image processing means to edit the multivalue image data via synthesis thereof.

29. A system according to claim 24, wherein said editing means causes said multivalue image processing means to edit the multivalue image data via enlargement or reduction thereof.

30. A system according to claim 24, wherein said editing means causes said multivalue image processing means to execute gradation conversion of the multivalue image data.

31. A system according to claim 24, wherein said editing means causes said multivalue image processing means to execute edge emphasis of the multivalue image data.

32. A system according to claim 24, wherein said editing means causes said multivalue image processing means to execute a variety of editing processes for a cut-out portion of an image represented by the multivalue image data.

33. A system according to claim 24, wherein said editing means includes means for displaying the multivalue image data and a pointing device.

34. A system according to claim 24, further comprising reading means for inputting the multivalue image data and printing means for outputting the multivalue image data.

35. A system according to claim 24, further comprising a TV camera connected to said multivalue image processing means for inputting the multivalue image data.

36. An image processing system comprising:
multivalue image processing means for image processing one pixel of image data of documents, originals, or the like as a multivalue digital signal (referred to as multivalue image data);
binary/multivalue converting means for converting binary image data into multivalue image data;
video signal input means for inputting a video signal; and
analog/digital converting means for converting the video signal input by said video signal input means into multivalue image data,
wherein said multivalue image processing means processes both the multivalue image data converted by said analog/digital converting means and the multivalue image data converted by said binary/multivalue converting means.

37. A system according to claim 36, wherein said multivalue image processing means edits the multivalue image data via cutting part of it out.

38. A system according to claim 36, wherein said multivalue image processing means edits the multivalue image data via rotation thereof.

39. A system according to claim 36, wherein said multivalue image processing means edits the multivalue image data via movement thereof.

40. A system according to claim 36, wherein said multivalue image processing means edits the multivalue image data via synthesis thereof.

41. A system according to claim 36, wherein said multivalue image processing means edits the multivalue image data via enlargement or reduction thereof.

42. A system according to claim 36, wherein said multivalue image processing means executes gradation conversion of the multivalue image data.

43. A system according to claim 36, wherein said multivalue image processing means executes edge emphasis of the multivalue image data.

44. A system according to claim 36, wherein said multivalue image processing means executes a variety of editing processes for a cut-out portion of an image represented by the multivalue image data.

45. A system according to claim 36, wherein said multivalue image processing means includes display means for displaying the multivalue image data.

46. A system according to claim 36, wherein said multivalue image processing means processes both the multivalue image data converted by said binary/multivalue converting means and the multivalue image data converted by said analog/digital converting means.

47. A system according to claim 36, wherein said multivalue image processing means monitors and controls at least a shutter, a zoom, a stop, or a focus device of said video signal input means for input of the video signal.

48. A system according to claim 36, wherein said multivalue image processing means monitors and controls at least brightness or contrast of the video signal input by said video signal input means.

49. A system according to claim 36, wherein said multivalue image processing means controls a shutter device of the video signal input means and includes a memory for storing multivalue image data converted by the analog/digital converting means from a video signal being input by said video signal input means when the multivalue image processing controls the shutter device.

* * * * *

UNITED STATES PATENT AND TRADEMARK OFFICE
CERTIFICATE OF CORRECTION

PATENT NO. : 4,905,097

DATED : February 27, 1990

INVENTOR(S) : YASUHIRO WATANABE, ET AL.

It is certified that error appears in the above-identified patent and that said Letters Patent is hereby corrected as shown below:

COLUMN 3

Line 3, "editing" should read --edited--.

COLUMN 6

Line 18, "figure edition S8;" should read --figure editing S8;--.

COLUMN 9

Line 32, "of" should read --or--.

Signed and Sealed this

Eleventh Day of June, 1991

Attest:

HARRY F. MANBECK, JR.

Attesting Officer

Commissioner of Patents and Trademarks